C. W. PUTNAM.
TROLLEY WHEEL.
APPLICATION FILED JULY 24, 1909.

947,759.

Patented Jan. 25, 1910.

WITNESSES:
H. L. Sprague
P. M. Mowry

INVENTOR,
Clesson W. Putnam,
BY
ATTORNEY.

UNITED STATES PATENT OFFICE.

CLESSON W. PUTNAM, OF HOLYOKE, MASSACHUSETTS, ASSIGNOR TO B. F. PERKINS AND SON, INCORPORATED, OF HOLYOKE, MASSACHUSETTS, A CORPORATION OF MASSACHUSETTS.

TROLLEY-WHEEL.

947,759.

Specification of Letters Patent. Patented Jan. 25, 1910.

Application filed July 24, 1909. Serial No. 509,328.

*To all whom it may concern:*

Be it known that I, CLESSON W. PUTNAM, a citizen of the United States of America, and resident of Holyoke, in the county of Hampden and State of Massachusetts, have invented certain new and useful Improvements in Trolley-Wheels, of which the following is a full, clear, and exact description.

The object of this invention is to provide, in a practicable and inexpensive manner, a trolley wheel which has tightly fitted in a central opening through the body thereof an axle-receiving bushing and which has a plurality of lubricant containing pockets in the body portion of the wheel which are separated by substantially radial partitions and which are inwardly open adjoining the intermediate part of the bushing with provisions for the conveyance of the lubricant from the pockets through the bushing to the axle bearing.

The invention consists in a trolley wheel constituted by parts constructed and combined substantially as hereinafter described in conjunction with the accompanying drawings and set forth in the claims.

Figure 2:
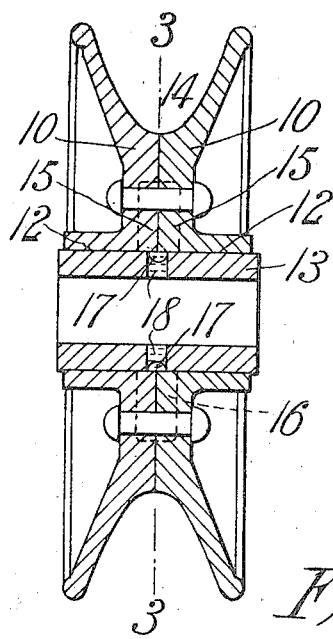
Figure 1:
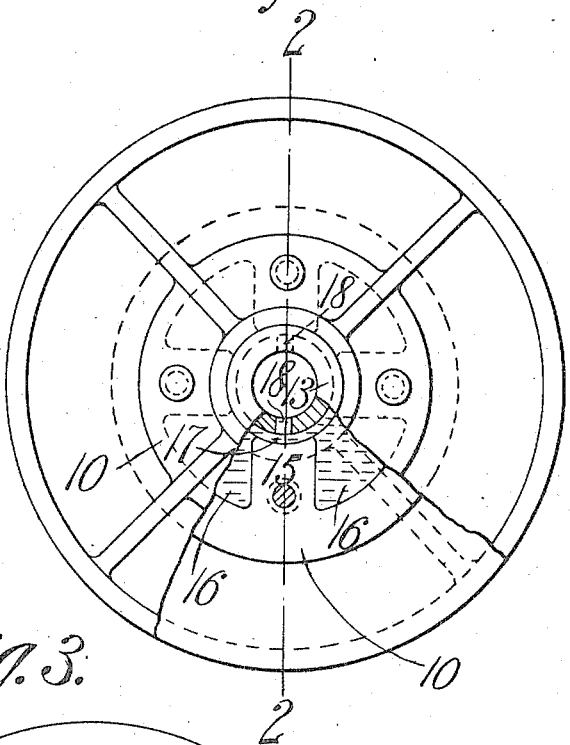
Figure 3:
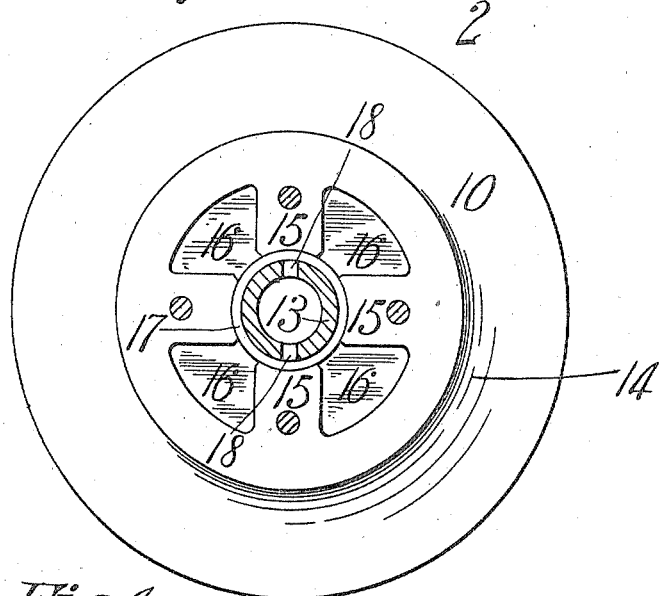
Figure 4:
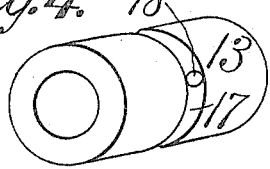

In the drawings:—Figure 1 is a side elevation of the improved trolley wheel with a portion of one side member thereof broken out for disclosing portions of two of the pockets and the part which separates them; Fig. 2 is a sectional view on line 2—2, Fig. 1; Fig. 3 is a section on line 3—3, Fig. 2; Fig. 4 is a perspective view of the bushing.

Similar characters of reference indicate corresponding parts in all of the views.

In the drawings the trolley wheel is shown as constituted by a pair of separately constructed opposing side sections 10, 10, having alined central openings 12, 12, therethrough for the reception with a driving fit therein of the axle bushing 13, said sections being marginally formed so as to produce the usual peripheral annular groove 14; and the said sections have at the portions of the bodies thereof, outwardly beyond their central openings 12, radially extending flat faced ribs 15, 15, with inwardly opening recesses 16 between and separated by said ribs. The said ribs are facewise matched together to constitute radial partitions between the inwardly opening lubricant receiving chambers formed by the said recesses 16. Rivets, bolts, or like fastening devices are extended transversely through and unite the said sidewise adjoined sections. The bushing has midway of its length and externally thereof an annular groove 17 and one or more ducts 18 leading from the groove to the central axle hole in the bushing. Previous to the driving of the bushing in its place in the body of the wheel, a heavy grease or other suitable lubricant is provided in the inwardly opening ducts or chambers 16; and the bushing when provided in its place holds the grease in such pockets excepting such small quantities thereof as will gradually, in the use of the machine, be required for lubrication, and which for such effect will pass from the pockets into the annular groove 17 and by way of the ducts 18 to the hole through the bushing in which the trolley wheel axle has its bearing relatively to the wheel.

I claim:

1. A trolley wheel consisting of a pair of separately constructed, opposing, side sections having alined central openings therethrough, and marginally formed so as together to produce a peripheral annular groove, said sections having at the portions of the bodies thereof, outwardly beyond their central openings, inwardly projecting flat faced ribs with inwardly opening recesses between, and separated by, said ribs, said ribs being facewise matched together to conjointly form radial partitions between the several inwardly opening pockets created by said recesses, fastening means extending transversely through, and uniting, the said sidewise adjoined sections, and a bushing fitted in the central hole through the united sections, having a way for lubricant leading from communication with the inwardly opening pockets to the axle receiving hole in the bushing.

2. A trolley wheel consisting of a pair of separately constructed, opposing, side sections having alined central openings therethrough, and marginally formed so as together to produce a peripheral annular groove, said sections having at the portions of the bodies thereof, outwardly beyond their central openings, radially extending flat faced ribs with inwardly opening recesses between, and separated by, said ribs,—said ribs being facewise matched together to constitute radial partitions between the inwardly opening lubricant receiving chambers formed by said recesses, rivets extending transversely through, and uniting, the said sidewise adjoined sections, and a bushing fitted in the central hole through the united sections, having, midway of its length and externally thereof, an annular groove, and one or more ducts leading from such groove to the central axle hole in the bushing.

Signed by me at Springfield, Mass., in presence of two subscribing witnesses.

CLESSON W. PUTNAM.

Witnesses:
G. R. DRISCOLL,
WM. S. BELLOWS.